3,470,231
METHOD OF STABILIZING NITRIC ACID ESTERS
Ralph P. Gelardo, West Hyattsville, Md., and Otto Reitlinger, Arlington, Va., assignors to the United States of America as represented by the Secretary of the Navy
No Drawing. Filed May 29, 1967, Ser. No. 643,303
Int. Cl. C07c 77/02
U.S. Cl. 260—466          9 Claims

ABSTRACT OF THE DISCLOSURE

A process for purifying and stablizing nitric acid esters containing carbonyl inpurities which comprises treating said impure nitric acid esters with a reducing agent such as sodium borohydride for a time sufficient to reduce said carbonyl impurities to their respective alcohols and thereafter separating said alcohols from said esters.

Background of invention

This invention relates to a method for purifying and stabilizing nitric acid esters and more particularly to a method for purifying and stabilizing nitric acid esters of the type prepared by the O-nitration of a polyhydric alcohol, characterized by the grouping:

$$R-(C-O-NO_2)_n$$

wherein R is an aliphatic or a cycloaliphatic radical and $n$ is an integer from 2–4.

The nitric acid esters purified by the method of this invention are generally useful in high explosive compositions for a wide variety of applications from explosive powders to dynamites. Their explosive properties are generally attributable to their very favorable nitrogen-oxygen balance and the presence of the highly reactive and decomposible R—O—NO₂ structure. Unfortunately, it is this same structure which also renders these compounds highly sensitive to heat, friction and shock and which prevents safe deployment in ordnance applications. Moreover, due to the normally sensitive nature of the nitric acid esters, even minor amounts of impurities will seriously affect their readiness to undergo hydrolic decomposition and hence it is necessary to meticulously purify these compounds prior to use. Prior art techniques for purifying the esters, however, have not been wholly satisfactory either because of their inability to adequately purify the ester to a sufficient degree or because these techniques have proven unduly time consuming, tedious and costly.

According to the most common prior art technique, the ester is repeatedly washed in warm water and sodium carbonate for as many as ten washings. While this method does succeed in purifying the ester to some extent, it involves considerable loss of time and often results in significant reduction in ultimate yield due to loss of product through dissolution in the sodium carbonate alkali solution. Moreover, this method fails to provide an adequate degree of purity and stability to premit use in those applications requiring minimum sensitivities to shock, friction and heat. Many modifications of this method have been proposed, but none have proved more satisfactory in eliminating the basic deficiencies of the basic sodium carbonate wash treatment.

Summary of the invention

It is therefore, an object of this invention to provide a method for purifying nitric acid esters, particularly those of the type characterized by the presence of at least two nitroxy groupings. It is a further object of this invention to provide a method for purifying and stabilizing nitric acid esters which is simple, fast and which provides a high degree of product purity and relatively high shock, friction and thermal insensitivity.

These and other objects are provided by treating the nitric acid ester with a reducing agent, preferably of a type similar to sodium borohydride, for a time sufficient to reduce the deleterious impurities to their respective alcohols, and thereby permitting ready separation of said alcohols from said nitric acid esters by those simple, convenient techniques well known to the prior art, such as gravity separation or absorption.

Detailed description

Any nitric acid ester can be purified by the method of this invention, but best results are obtained with those nitric acid esters containing two or more nitroxy groupings. The esters of this type are prepared by the direct O-nitration of a polyhydric alcohol in the presence of one or more oxidizing acids such as sulfuric acid, phosphoric acid, acetic acid, or perchloric acid. Other methods for nitrating the polyhydric alcohol includes oxidation by nitrogen dioxide or dinitrogen tetroxide. Among those nitric acid esters particularly found operable are the nitrates of cyclopentanone and cyclohexanone, ethyleneglycol dinitrate, 1,3-propane dinitrate, 1,2-propanediol dinitrate, 1,3 butanediol dinitrate, 2,3-butanediol dinitrate, nitroglycerine, 3-chloro - 1,2 - propanediol dinitrate, 1,3-dichloro-2-propanediol dinitrate, dinitroglycol, diethylene glycol dinitrate, triethylene glycol dinitrate, pentaerythritol tetranitrate, and the like.

Since nitration requires the use of high oxidizing conditions, oxidation of the polyhydric alcohol usually occurs as a competing reaction to esterification and results in the formation of small amounts of certain carbonyl compound impurities in the product. Such impurities take the form of any of the various corresponding ketones, aldehydes and in some cases even the acids of the polyhydric alcohol being nitrated. These are the impurities which are now believed to be the most deleterious in causing undesirable hydrolic decomposition and which are generally insignificantly removed by prior art techniques.

By the process of this invention, carbonyl impurities may be removed from the nitric acid ester by treating the impure ester with a reducing agent, such as sodium borohydride in an amount sufficient to substantially reduce the residual carbonyl compound impurities to their respective alcohols. Usually 0.1% to 10%, of reducing agent based on the weight of the ester, is sufficient, although 0.5 to 2.0% is preferred. As alcohols, these impurities are readily separated by methods well known in the art for effecting liquid-liquid separation such as water extraction, simple gravity separation, absorption by suitable clays, and in some cases, even careful distillation.

In treating the nitric acid esters with the reducing agent, it is usually convenient to use a water miscible solvent. Good results are obtained when using the various alcohols such as ethyl alcohol, isopropyl alcohol, glycerol, etc. The choice of solvent is not critical and is dependent only on the reducing agent selected. After mixing dissolving the impure ester with the reducing agent, the mixture is stirred for a time sufficient to convert substantially all of the carbonyl compounds to their corresponding alcohols. Normally one to forty hours is adequate when using from about 0.1% to about 10% by weight sodium borohydride, although shorter or longer periods may be necessary depending on the ester and reducing agent selected. At the termination of the reaction, the mixture is drowned with an excess quantity of water which serves to decompose any excess reducing agent still present and also to effect the phase separation between the water-solvent mixture, containing the alcohol impurities, and the ester.

If desired, the ester may optionally be additionally water washed and dried. The temperature of the purification reaction is not critical and the present method is usually most conveniently practiced at room temperatures or lower. The method of this invention may be used either alone or in combination with prior techniques. For instance, if desired, the nitric acid ester may be initially purified by a sodium carbonate wash thereby removing excess nitrating acids. Alternatively, the present treatment may follow dissolution and recrystallization of the ester.

The general nature of the invention having been set forth, the following examples are presented as specific illustrations thereof. It will be understood, however, that the invention is not limited to the examples but is susceptible to different modified embodiments which come within the scope of the claims. All parts and percentages are given by weight.

Example I 25 parts of 1,5-dinitroxypentane prepared by nitration of 1,5-propanediol is suspended in 40 parts of isopropyl alcohol. The mixture is stirred and two tenths parts by weight of sodium borohydride is added. Stirring is continued for nine hours at room temperature. The reaction mixture is then mixed with three times its volume of water thereby decomposing excess sodium borohydride. The product 1,5-dinitroxypentane is permitted to separate from the water alcohol phase and the oily organic phase is separated by simple gravity separation, water washed twice, and dried over anhydrous sodium sulfate.

Example II 25 parts of 2,4-dinitroxypentane is dissolved in 40 parts of isopropyl alcohol. The mixture is stirred and four tenths parts of sodium borohydride is added. Stirring is continued for ten hours at room temperature. The reaction mixture is then mixed with three times its volume of water thereby decomposing excess sodium borohydride. The 2,4-dinitroxypentane is allowed to separate from the water alcohol mixture and is separated by simple gravity separation. The product is water washed twice and dried over anhydrous sodium sulfate.

Similar experiments were repeated using 2,2-dimethyl-1,3-dinitroxypropane, 2,4-dinitroxypentane and 1,6-dinitroxyhexane.

To compare the stability of the nitric acid esters treated by the methods of this invention with the same compound purified and stabilized by prior art techniques, each of the above esters were subjected to a sodium carbonate wash technique. Accordingly, each of the above impure nitric acid esters were alternatively washed with excess water at 70° C. and a 3% sodium carbonate solution. Washing was repeated ten times over a period of one week and the purity of the compounds were compared with those purified by the present reducing agent technique. The results are summarized below.

TABLE

| Compound | Heat test values (min.) | |
|---|---|---|
| | Washing method | Sodium borohydride method |
| 1,5-dinitroxypentane | 6 | 27 |
| 2,4-dinitroxypentane | 3 | 20 |
| 2,2-dimethyl-1,3-dinitroxy propane | 7 | 18 |
| cis-dinitroxycyclopentane | 1.5 | 17 |
| 1,6-dinitroxyhexane | 1.5 | 20 |

These results were obtained by placing a 2 ml. portion of each nitric acid ester in a set of three test tubes 5½″ long with a ½″ internal diameter. Standard KI-Starch test paper about ½″ long and ⅜″ wide was suspended within the test tube. The upper half of the paper was moistened with a pure 50% solution of glycerin in water and the tubes were placed in a hot water bath of 82.2° C. plus or minus 1° C. The time was noted from the initial placement of the tubes in the bath to the first appearance of discoloration of the test paper. The average time was recorded. The foregoing table shows that nitric acid esters treated by the reducing agent technique of this invention are as much as seven times more stable than the same material stabilized by the standard sodium carbonate wash technique.

As will be evident to those skilled in the art, various modifications can be made in light of the foregoing disclosure without departing from the scope and spirit thereof. Having described the invention what is claimed and desired to be protected by Letters Patent is:

1. A method for purifying a nitric acid ester of the formula $R-(C-O-NO_2)_n$ wherein R is an aliphatic or a cycloaliphatic radical and $n$ is an interger from 2–4 containing carbonyl compound impurities, which comprises contacting said nitric acid ester with an amount of sodium borohydride reducing agent sufficient to substantially reduce said carbonyl compound to their corresponding alcohols, and thereafter separating said alochols from said nitric acid ester.

2. The method of claim 1 wherein said nitric acid ester is contacted with from about 0.1% to about 10% by weight of sodium borohydride.

3. The method of claim 2 wherein the sodium borohydride is contacted with said nitric acid ester for a time sufficient to reduce said carbonyl compound impurities to their corresponding alcohols.

4. The method of claim 3 wherein the sodium borohydride is contacted with said nitric acid ester for a time of at least about one hour to about forty hours.

5. The method of claim 2 wherein the nitric acid ester is admixed with an alcoholic solvent and the nitric acid ester solution is contacted with said sodium borohydride.

6. The method of claim 5 wherein the alcohol solvent is isopropyl alcohol.

7. The method of claim 5 wherein the alcoholic solvent containing said residual carbonyl compound alcohol is separated from said nitric acid ester by addition of an excess quantity of water to the said nitric acid ester solution, thereby effecting a phase separation between said alcohols and said nitric acid, and thereafter decanting said alcohols from said nitric acid ester.

8. The method of claim 7 wherein the nitric acid ester is 1,5-dinitroxypentane which is suspended in isopropyl alcohol and contacted with from 0.5 to 1.0% by weight of sodium borohydride for a time sufficient to reduce said carbonyl compound impurity to its corresponding alcohol.

9. A method for purifying a nitric acid ester selected from the group consisting of 1,5-dinitroxypentane, 2,4-dinitroxypentane, 2,2-dimethyl-1,3-dinitroxypropane, cis-1,2-dinitroxycyclopentane, 1,6-dinitroxyhexane, 1,2-dinitroxyethane, 1,2-dinitroxypropane, 1,3-dinitroxybutane, 2,3-dinitroxybutane, 1,2,3-trinitroxypentane, 3-chloro-1,2-dinitroxypropane, 2,2′-dinitroxy ethyl ether, and pentaerythritol tetranitrate containing carbonyl compound impurities, which comprises contacting said nitric acid ester with an amount of sodium borohydride reducing agent sufficient to substantially reduce said carbonyl compound to their corresponding alcohols, and thereafter separating said alcohols from said nitric acid ester.

References Cited

UNITED STATES PATENTS 2,683,721   7/1954   Schlesinger et al. ___ 260—343.3

OTHER REFERENCES

Boschan et al.: Chemical Reviews, vol. 55, pp. 502–510 (1955).

Chaikin et al.: J. Am. Chem. Soc., vol. 71, pp. 122–125 (1949).

Brown et al.: J. Am. Chem. Soc., vol. 77, p. 3164 (1955).

Kollonitsch et al.: Nature, vol. 173, pp. 125–127 (1954).

LELAND A. SEBASTIAN, Primary Examiner

U.S. Cl. X.R.

260—467, 631, 635